(12) United States Patent
Harnik et al.

(10) Patent No.: US 9,569,444 B1
(45) Date of Patent: Feb. 14, 2017

(54) SELECTIVE OPERATION PUSHDOWNS FROM AN ANALYTICS PLATFORM TO BULK STORAGE

(71) Applicant: International Business Machines Corporation, Armonk, NY (US)

(72) Inventors: Danny Harnik, Tel Mond (IL); Dalit Naor, Tel Aviv (IL); Gil Vernik, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/968,057

(22) Filed: Dec. 14, 2015

(51) Int. Cl.
  *G06F 15/16* (2006.01)
  *G06F 17/30* (2006.01)
  *H04L 29/08* (2006.01)

(52) U.S. Cl.
  CPC ..... *G06F 17/30079* (2013.01); *H04L 67/1097* (2013.01); *H04L 67/26* (2013.01)

(58) Field of Classification Search
  CPC .............................. H04L 67/1097; H04L 67/10
  See application file for complete search history.

(56) References Cited

U.S. PATENT DOCUMENTS

| 2013/0152088 A1 | 6/2013 | Gkantsidis et al. |
| 2014/0040183 A1* | 2/2014 | Kache ............... G06F 17/30365 |
| | | 707/609 |

OTHER PUBLICATIONS

C. Gkantsidis et al., "Rhea: Automatic Filtering for Ustructured Cloud Storage," in Proceedings of the 10th USENIX conference on Networked Systems Design and Implementation, 2013, 13 pgs.

* cited by examiner

*Primary Examiner* — Hua Fan
(74) *Attorney, Agent, or Firm* — Cantor Colburn LLP; David Quinn

(57) ABSTRACT

A computer-implemented method for determining whether to perform a pushdown may include receiving a request for analytics to be performed by an analytics platform on data stored in bulk storage. An operation may be identified as a candidate for a pushdown, where the operation is selected from among one or more operations to be performed for fulfilling the request. The pushdown would require the operation to be performed at the bulk storage. The data may be sampled by reading one or more samples of the data, where the one or more samples are a fraction of the data. The operation may be performed, by a computer processor, on the one or more samples. It may be determined, based on performing the operation on the one or more samples, whether to perform the pushdown of the operation.

18 Claims, 4 Drawing Sheets

SELECTIVE OPERATION PUSHDOWNS FROM AN ANALYTICS PLATFORM TO BULK STORAGE

BACKGROUND

Embodiments of the present invention relate to operation pushdowns and, more specifically, to selective operation pushdowns from an analytics platform to bulk storage.

Analytics platforms or clusters, such as Apache™ Spark™, Apache Hadoop®, and others, are dedicated hardware or software environments for performing analysis on large amounts of data. The use of big data, which refers to large sets of unstructured or semi-structured data, has made such analytics platforms essential in the manipulation of data in modern data centers. Typically, to perform an analytics task, an analytics platform ingests data and processes it locally. In many cases, the bulk of the data is not permanently stored on the analytics platform. Rather, the data is stored in bulk storage, such as OpenStack® Swift, Amazon® Simple Storage Service (S3), or Ceph™ or on a file system or database. Thus, data is migrated onto the analytics platform for analysis.

The operation of migrating from bulk storage to an analytics platform is costly and is typically limited by the bandwidth between the bulk storage and the analytics platform. To relieve this bottleneck, some operations may be pushed from the analytics platform to bulk storage, in an operation referred to as a pushdown or offloading, so that the bulk storage performs these pushed operations.

For example, if analysis is desired only on specific fields (e.g., addresses and phone numbers only), then it likely not useful to migrate other fields of data as well. In that case, a SELECT operation, which selects specific fields from the data, may be pushed down to the bulk storage, such that only the specific fields desired are migrated to the analytics platform. The analytics platform can then perform any further processing on the migrated data, which excludes unneeded fields. As a result of the pushdown, the amount of data migrated can be reduced, as compared to migrating all the fields of the data. In the case of a FILTER operation, which identifies objects that meet certain criteria in the data, it may be more efficient to perform this operation at the bulk storage, thus delivering to the analytics platform only the records that meet the filtering criteria.

SUMMARY

According to an embodiment of this disclosure, a computer-implemented method for determining whether to perform a pushdown includes receiving a request for analytics to be performed by an analytics platform on data stored in bulk storage. An operation is identified as a candidate for a pushdown, where the operation is selected from among one or more operations to be performed for fulfilling the request. The pushdown would require the operation to be performed at the bulk storage. The data is sampled by reading one or more samples of the data, where the one or more samples are a fraction of the data. The operation is performed, by a computer processor, on the one or more samples. It is determined, based on performing the operation on the one or more samples, whether to perform the pushdown of the operation.

In another embodiment, a system for determining whether to perform a pushdown includes a memory having computer readable instructions and one or more processors for executing the computer readable instructions. The computer readable instructions include receiving a request for analytics to be performed by an analytics platform on data stored in bulk storage. Further according to the computer readable instructions, an operation is identified as a candidate for a pushdown, where the operation is selected from among one or more operations to be performed for fulfilling the request. The pushdown would require the operation to be performed at the bulk storage. The data is sampled by reading one or more samples of the data, where the one or more samples are a fraction of the data. The operation is performed on the one or more samples. It is determined, based on performing the operation on the one or more samples, whether to perform the pushdown of the operation.

In yet another embodiment, a computer program product for determining whether to perform a pushdown includes a computer readable storage medium having program instructions embodied therewith. The program instructions are executable by a processor to cause the processor to perform a method. The method includes receiving a request for analytics to be performed by an analytics platform on data stored in bulk storage. Further according to the method, an operation is identified as a candidate for a pushdown, where the operation is selected from among one or more operations to be performed for fulfilling the request. The pushdown would require the operation to be performed at the bulk storage. The data is sampled by reading one or more samples of the data, where the one or more samples are a fraction of the data. The operation is performed on the one or more samples. It is determined, based on performing the operation on the one or more samples, whether to perform the pushdown of the operation.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Although operation pushdowns can improve efficiency in terms of the actual migration, they have the potential to slow down analytics processing as a whole rather than speed it up. For instance, suppose analysis of a set of objects is desired, but only the objects representing people with a certain area code are relevant. In this case, conventionally, a pushdown of a FILTER operation may be performed to first identify which of the objects have phone numbers with the area code. Then only those objects would be migrated to the analytics platform.

However, in the extreme case, the objects being examined may all have the specified area code. As a result, to perform the operation pushdown, each object in the data is examined to determine whether it has the area code, but not a single one of such objects ends up being filtered out. Thus, this time spent to perform the pushdown was wasted, in that it used processing power, memory, and time, without saving bandwidth during the migration.

Some embodiments of this disclosure are sampling systems configured to sample data on bulk storage to determine whether an operation pushdown should be performed. Such a sampling system may avoid the problem of performing work for the pushdown, when that work is estimated to come at a greater cost than the estimated benefit of the pushdown.

Figure 1:
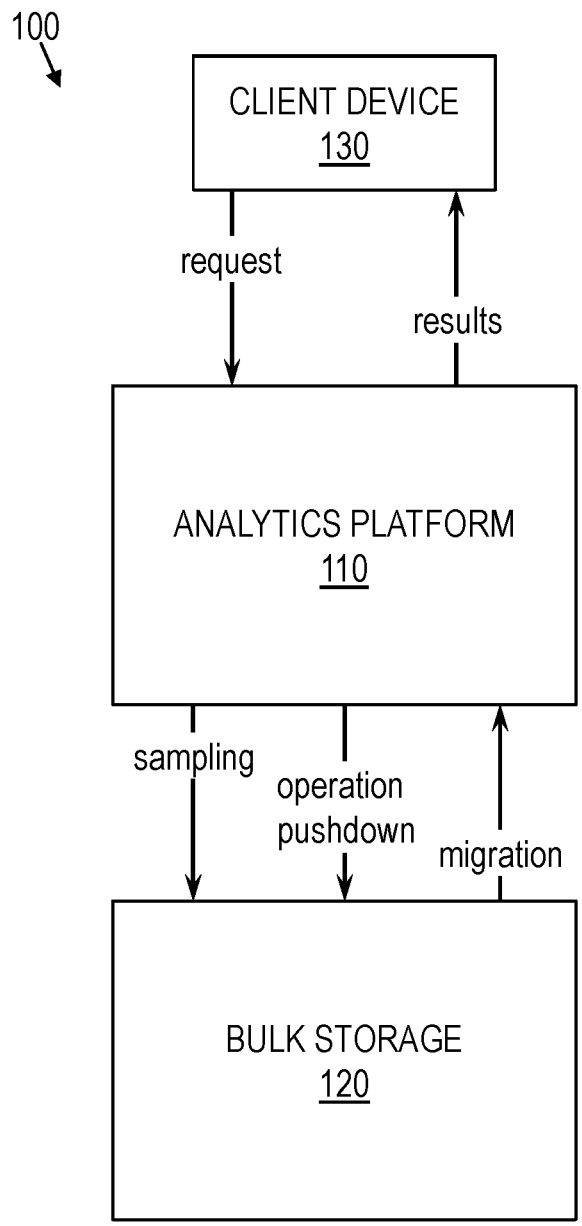
FIG. 1 is a block diagram of a sampling system, according to some embodiments of this disclosure.

FIG. 1 is a block diagram of a sampling system 100, according to some embodiments of this disclosure. As shown, the sampling system 100 may include or involve an analytics platform 110, bulk storage 120, and a client device 130. The analytics platform 110 may, for example, Spark, Hadoop, or a database environment using Structured Query Language (SQL), SQLLite, or Not Only SQL (NoSQL). The bulk storage 120 may be, for example, Swift, Amazon S3, or Ceph. However, it will be understood that other analytics platforms 110 and bulk storage 120 may be used instead of or in addition to these.

The bulk storage 120 may store data in the form of one or more objects, each of which may be a record, file, or collection, and each of which may have one or more fields. In some embodiments, these objects are not indexed in the bulk storage 120, and the objects may be unstructured. In database environments or other indexed environments, filtering is typically efficient, and thus, some embodiments of the sampling system 100 may provide a greater benefit with bulk storage 120 that is not indexed. In contrast, existing filtering and selection mechanisms for unstructured and non-indexed data are typically much less efficient, and thus, those environments may derive a greater benefit from the sampling system 100 described herein. However, it will be understood that the sampling system 100 is not limited to non-indexed or unstructured bulk storage 120.

Generally, the client device 130 may provide an analytics request to the analytics platform 110, which may in turn communicate with the bulk storage 120, where the objects to be processed are stored. Sampling may be performed on the objects in the bulk storage 120 to determine whether to perform a pushdown as part of fulfilling the request. Based on the determination, the bulk storage 120 may perform one or more operations as part of responding to the request, and may deliver the resulting data to the analytics platform 110. The analytics platform 110 may finish processing the request and may return results to the client device 130.

Figure 2:
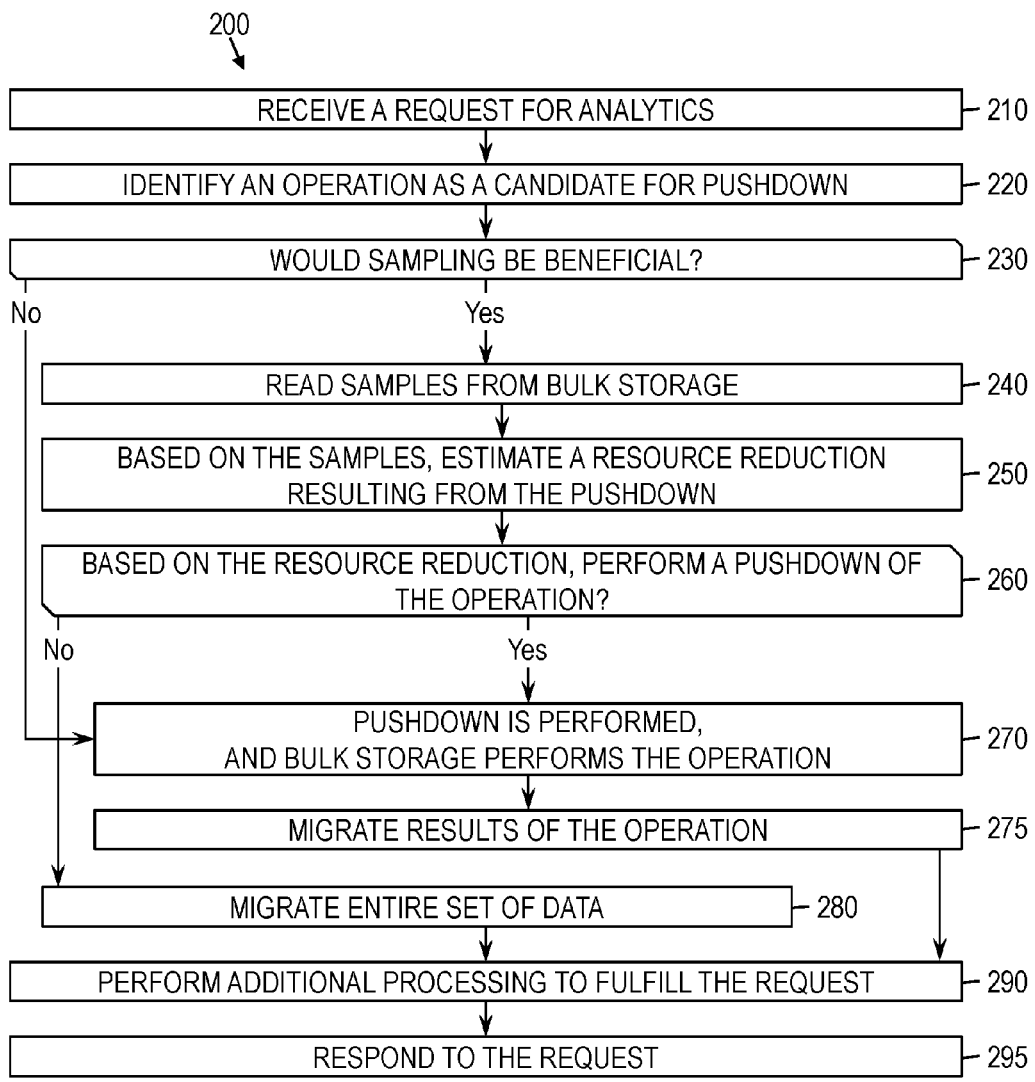
FIG. 2 is a flow diagram of a method for sampling data in bulk storage to determine whether to perform an operation pushdown, according to some embodiments of this disclosure.

FIG. 2 is a flow diagram of a method 200 for sampling data in bulk storage to determine whether to perform an operation pushdown, according to some embodiments of this disclosure.

As shown, at block 210, a request for analytics of data may be received at the analytics platform 110. Thus request may come from the client device 130. The analytics platform 110 may then begin a job for processing the request, where that job may include one or more operations for fulfilling the request. At block 220, an operation of the job may be identified as a candidate for an operation pushdown. For instance, a FILTER operation may be included as part of the job, and this type of operation may automatically be deemed a candidate operation. Identification of candidate operations may be performed by various means. For example, and not by way of limitation, the analytics platform 110 may identify as candidate operations those operations of the job that fit certain criteria (e.g., being certain types of operations). For another example, the request from the client device 130 may specify which operations are candidate operations for potential pushdown.

At decision block 230, the sampling system 100 may determine whether sampling would be beneficial for evaluating whether to perform a pushdown. In some embodiments, this determination may be made by the analytics platform 110. Certain operations may prompt sampling, while others may not. For instance, in some embodiments, in the case of a SELECT operation, the sampling may be skipped as it may be determined without sampling whether to perform the pushdown. A SELECT operation selects specific fields from all objects in the data, and thus, there is likely to be a significant reduction in the data being migrated. As a result, the sampling discussed below may be skipped for a SELECT operation, and a pushdown may be performed. Thus, if sampling is deemed not to be beneficial at decision block 230, then a pushdown may be performed at block 270.

If it is determined that sampling would be beneficial in evaluating whether to perform a pushdown, the resource reduction potential of performing a pushdown on the operation may be evaluated through sampling. This evaluation may be performed, for example, at the analytics platform 110 or at the bulk storage 120. In the former case, the analytics platform 110 may read samples across a communication channel between the analytics platform 110 and the bulk storage 120, and may perform the evaluation at the analytics platform 110. In the latter case, however, the analytics platform 110 may notify the bulk storage 120 of the candidate operation, and the bulk storage 120 may perform the sampling and evaluation to determine whether to perform the candidate operation before migrating data to the analytics platform 110.

To perform the evaluation, at block 240, samples are read from the data in bulk storage 120. In some embodiments, the samples may be only a fraction of the data, excluding some other portion of the data. For instance, where the data includes multiple objects, the fraction used as samples may be a proper subset of the objects in the data, excluding some other objects in the data. The samples may be selected randomly as, in some instances, the data may be sorted in the bulk storage 120. For example, and not by way of limitation, if the data being sampled is a single object in the form of a log, fifty random lines may be read from the log as samples. For another example, if the data being sampled includes multiple objects in the form of records, a subset of those records may be read as samples. The number of samples read may be based on various factors, such as the total size of the data. However, in some embodiments, standard statistical guarantees may be used to determine an appropriate sample size.

At block 250, based on the samples read, the sampling system 100 may estimate a resource reduction, or cost savings, which may describe the reduction in resources required to migrate only the results of the operation, versus migrating all the data if no pushdown is performed. To this end, the sampling system 100 may perform the candidate operation on the samples. The resource reduction may be, for example, in terms of bandwidth or time. For instance, in the case of a FILTER operation, the analytics platform 110 may determine what percent of the samples would be filtered out. It may then be assumed that the same percentage would be filtered out of the entire set of data. Based on this, the sampling system 100 may determine how much bandwidth would be saved in migrating the data to the analytics platform 110 with a pushdown versus without one, or the sampling system 100 may determine how much time would be saved in migrating only the data remaining after the filtering, versus migrating the entire set of data.

At decision block 260, based on the resource reduction that was estimated, the sampling system 100 may determine whether to perform a pushdown of the candidate operation. Thus determination may be made in various ways. In some embodiments, for instance, a threshold size may be established, such that the pushdown is performed only if the migration traffic would be reduced by an amount of data that is at least the threshold size. For instance, with a FILTER operation, the pushdown may be performed if the amount or percentage of data estimated to be filtered out of the entire data set meets the threshold.

In some embodiments, the threshold may be a function of the environment. For instance, the threshold may be based on the processing power of the bulk storage 120, the bandwidth between the analytics platform 110 and the bulk storage 120, or both. Less bandwidth between the analytics platform 110 and the bulk storage 120 correlates to more benefit in every byte of data reduced for the migration. However, if the bulk storage 120 would be much less efficient at performing the operation than the analytics platform 110 would be, then a greater resource reduction may be needed to outweigh this inefficiency. Further, in some embodiments, the threshold may change dynamically as the environment (e.g., the bandwidth, the efficiency of the bulk storage 120) changes.

In some embodiments, to determine whether to perform the pushdown, the sampling system 100 may estimate a cost of performing the pushdown and may compare this cost to the resource reduction. The cost may be in terms of processing power, memory consumption, time, some other factor, or a combination thereof. This cost may be calculated based on the performance of the candidate operation on the samples. As a result of performing the operation, the sampling system 100 may thus observe the cost of performing the operation on the samples. With knowledge of how the size of the sample compares to the entire size of the data, the sampling system 100 may thus estimate the cost of performing the operation on the entire set of data. If the cost and the resource reduction or measured in the same terms (e.g., time), then this comparison may be straight forward and may involve determining whether the value of the resource reduction is greater than the value of the cost. In some embodiments, however, the sampling system 100 may have an established formula for comparing the two.

If it is determined based on the sampling that the pushdown should be performed, then at block 270 the bulk storage 120 may perform the operation, in performance of the pushdown. At block 275, the results of the operation may be migrated to the analytics platform 110. However, if it is determined that the pushdown should not be performed, then at block 280, the entire set of data may be migrated to the analytics platform 110, where the operation may be performed.

At block 290, additional processing to complete the job and fulfill the request may be performed, and at block 295, the analytics platform 110 may respond to the request with the results of the job.

In some embodiments, the request may require a combination of operations, some of which may be candidate operations for potential pushdown. Such a case may be handled in various ways. For instance, in some embodiments, prior to performing each such candidate operation, the sampling system 100 may perform blocks 230 through 280 for the candidate operation. The result may be that a sequence of operations are pushed down to the bulk storage 120. In some embodiments, however, the sampling system 100 may consider two or more operations together during sampling. In that case, various combinations of the operations may be performed on the samples to determine whether to perform any pushdowns and, if so, which combination of operations are pushed down and performed by the bulk storage 120.

In some embodiments, compression may be used to further reduce the bandwidth being spent when migrating data from the bulk storage 120 to the analytics platform 110. However, it may initially be unclear whether compression would be worthwhile, when comparing the time required to perform the compression versus the reduction in the size of the data to be migrated.

Figure 3:
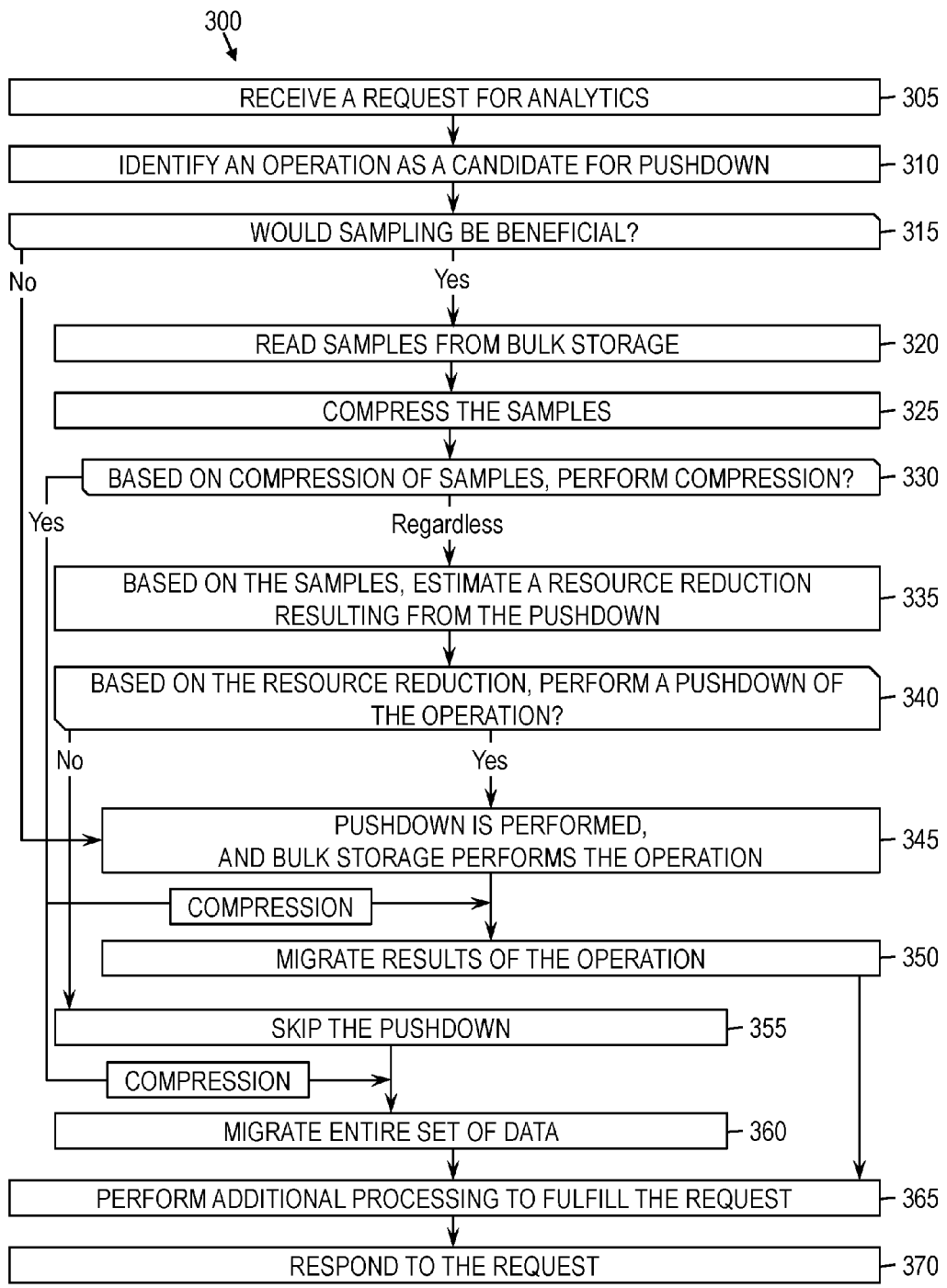
FIG. 3 is a flow diagram of a method for sampling data in bulk storage to determine whether to perform compression while determining whether to perform an operation pushdown, according to some embodiments of this disclosure.

FIG. 3 is a flow diagram of a method 300 for sampling data in bulk storage to determine whether to perform compression while determining whether to perform an operation pushdown, according to some embodiments of this disclosure. Many of the operations in this method 300 are similar to those of the method 200 above, and those operations are merely summarized in the below description.

As shown, at block 305, a request for analytics on a set of data may be received at the analytics platform 110. The analytics platform 110 may then begin a job for processing the request. At block 310, an operation of the job may be identified as a candidate for an operation pushdown. At decision block 315, it may be determined whether sampling would be beneficial for evaluating whether a pushdown should be performed. If sampling would not be beneficial, then a pushdown may be performed at block 345.

If it is determined that sampling would be beneficial in evaluating whether to perform a pushdown, then at block 320, samples may be read from the data in bulk storage 120.

At block 325, using one or more compression techniques, compression may be performed on the samples. In some embodiments, this compression is performed by the same component that applies the candidate operation to the samples. Because the reduction in data size varies across compression techniques and varies based on the specific data being compressed, the benefit of each compression technique might not be known prior to the sampling. By testing the compression techniques on the samples, and observing the size reduction resulting from the compression, the sampling system 100 may estimate the size reduction of each compression technique if applied to the entire set of data. The sampling system 100 may also observe the time to perform the compression techniques, and may thus estimate the time to compress all the data to be migrated. Based on these estimates, at decision block 330, the sampling system 100 may determine whether to perform a compression technique on the data to be migrated. In some embodiments, to this end, the sampling system 100 may select the compression technique with the best results on the samples (i.e., the greatest size reduction), and may determine whether that size reduction outweighs the cost of performing the compression. If so, then the sampling system 100 may decide that the selected compression technique should be performed.

At block 335, regardless of the results of the compression, the sampling system 100 may estimate a resource reduction of performing the pushdown, based on the samples read. At decision block 340, it may be determined, based on the resource reduction, whether to perform the pushdown. If it is decided that the pushdown should be performed, then at block 345 a pushdown may be performed on the candidate operation. In other words, in this case, the bulk storage 120 may perform the operation. Further, if it was determined that a compression technique should be applied, then the data to be migrated may be compressed based on that compression technique after the candidate operation is performed. At block 350, the data resulting after the pushdown and the optional compression may be migrated to the analytics platform 110.

However, if it is determined that the resource reduction does not justify the pushdown, then the operation pushdown may be skipped at block 355. In that case, if it was determined that a compression technique should be applied, then the entire data set may be compressed based on that compression technique. At block 360, the entire set of data, with or without compression, may be migrated to the analytics platform 110, where the candidate operation may be performed.

At block 365, additional processing to complete the job may be performed, and at block 370, the analytics platform 110 may respond to the request with the results of the job.

Figure 4:
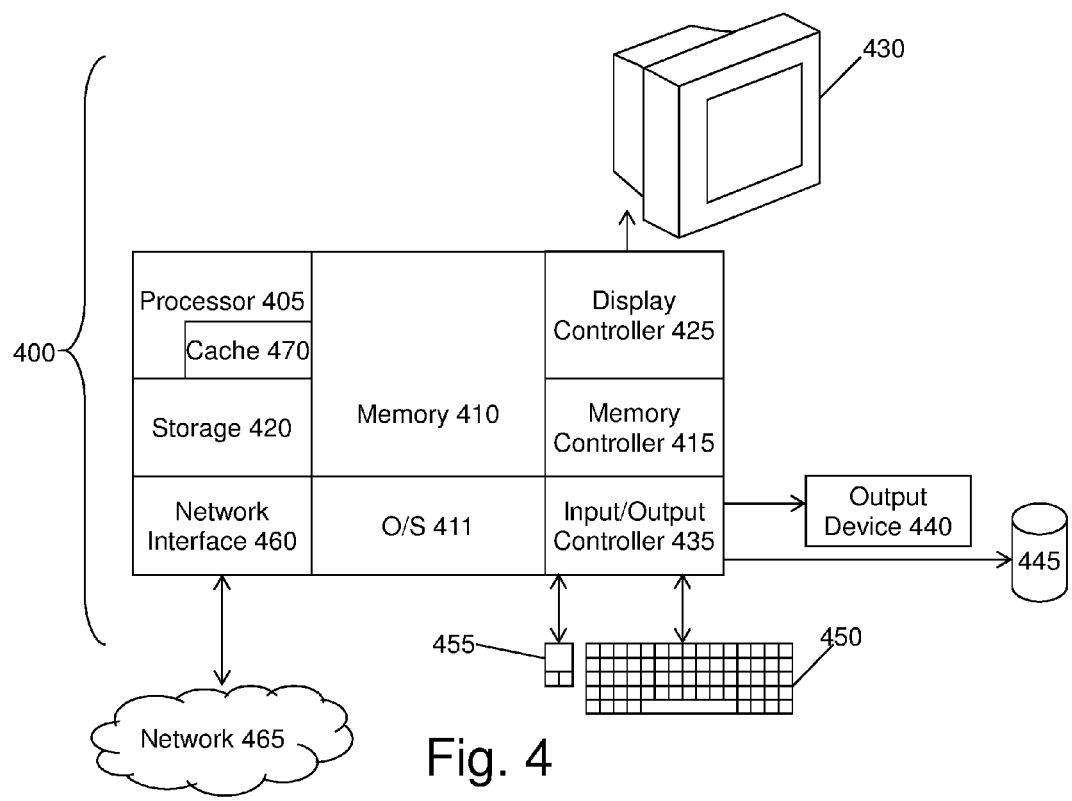
FIG. 4 is a block diagram of a computer system for implementing some or all aspects of the sampling system, according to some embodiments of this disclosure.

FIG. 4 illustrates a block diagram of a computer system 400 for use in implementing a sampling system 100 or method according to some embodiments. The sampling systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the analytics platform 110 and the bulk storage 120 may each run on one or more computer systems 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the sampling systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Sampling systems 100 and methods according to this disclosure may be embodied, in whole or in part, in computer program products or in computer systems 400, such as that illustrated in FIG. 4.

Technical effects and benefits of some embodiments include the ability to determine whether an operation pushdown is beneficial, thus avoiding costly pushdowns that do not sufficiently reduce bandwidth or otherwise improve efficiency. As a result, some embodiments of the sampling system 100 may achieve faster running times and improved resource utilization when processing analytics requests.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining whether to perform a pushdown, comprising:
    receiving a request for analytics to be performed by an analytics platform on data stored in bulk storage;
    identifying an operation as a candidate for a pushdown, the operation being selected from among one or more operations to be performed for fulfilling the request, wherein the pushdown would require the operation to be performed at the bulk storage;
    sampling the data by reading one or more samples of the data, the one or more samples being a fraction of the data;
    performing, by a computer processor, the operation on the one or more samples; and
    determining, based on performing the operation on the one or more samples, whether to perform the pushdown of the operation, wherein the determining whether to perform the pushdown of the operation comprises:
        estimating, based on performing the operation on the one or more samples, a resource reduction of migrating from the bulk storage to the analytics platform a result of the operation versus migrating the data in full; and
        determining whether the resource reduction exceeds a threshold.

2. The computer-implemented method of claim 1, further comprising dynamically changing a value of the threshold based on an environment of the analytics platform and the bulk storage.

3. The computer-implemented method of claim 1, wherein the determining whether the resource reduction exceeds the threshold comprises:
    estimating, based on performing the operation on the one or more samples, a resource cost of performing the operation at the bulk storage; and
    determining whether the resource reduction outweighs the resource cost.

4. The computer-implemented method of claim 1, further comprising:
    compressing the one or more samples; and
    determining, based on compressing the one or more samples, whether to compress the data before migration of at least a portion of the data from the bulk storage to the analytics platform.

5. The computer-implemented method of claim 1, further comprising:
    if determining whether to perform the pushdown of the operation comprises deciding not to perform the pushdown of the operation:
        receiving, at the analytics platform, the data from the bulk storage; and
        performing, at the analytics platform, the operation on the data; and
    if determining whether to perform the pushdown of the operation comprises deciding to perform the pushdown of the operation:
        instructing the bulk storage to perform the operation on the data; and
        receiving, at the analytics platform, a result of the operation from the bulk storage.

6. The computer-implemented method of claim 1, further comprising:
    identifying one or more other operations as candidates for pushdowns, the one or more other operations being selected from among the one or more operations to be performed for fulfilling the request;
    performing one or more combinations of the operation and the one or more other operations on the one or more samples; and
    determining, based on performing the one or more combinations of the operation and the one or more other operations on the one or more samples, which combination of the operation and the one or more other operations to push down to the bulk storage.

7. A system for determining whether to perform a pushdown, comprising:
    a memory having computer readable instructions; and
    one or more processors for executing the computer readable instructions, the computer readable instructions comprising:
        receiving a request for analytics to be performed by an analytics platform on data stored in bulk storage;
        identifying an operation as a candidate for a pushdown, the operation being selected from among one or more operations to be performed for fulfilling the request, wherein the pushdown would require the operation to be performed at the bulk storage;
        sampling the data by reading one or more samples of the data, the one or more samples being a fraction of the data;
        performing the operation on the one or more samples; and determining, based on performing the operation on the one or more samples, whether to perform the pushdown of the operation, wherein the determining whether to perform the pushdown of the operation comprises:
  estimating, based on performing the operation on the one or more samples, a resource reduction of migrating from the bulk storage to the analytics platform a result of the operation versus migrating the data in full; and
  determining whether the resource reduction exceeds a threshold.

8. The system of claim 7, the computer readable instructions further comprising dynamically changing a value of the threshold based on an environment of the analytics platform and the bulk storage.

9. The system of claim 7, the computer readable instructions wherein the determining whether the resource reduction exceeds the threshold comprises:
  estimating, based on performing the operation on the one or more samples, a resource cost of performing the operation at the bulk storage; and
  determining whether the resource reduction outweighs the resource cost.

10. The system of claim 7, the computer readable instructions further comprising:
  compressing the one or more samples; and
  determining, based on compressing the one or more samples, whether to compress the data before migration of at least a portion of the data from the bulk storage to the analytics platform.

11. The system of claim 7, the computer readable instructions further comprising:
  if determining whether to perform the pushdown of the operation comprises deciding not to perform the pushdown of the operation:
    receiving, at the analytics platform, the data from the bulk storage; and
    performing, at the analytics platform, the operation on the data; and
  if determining whether to perform the pushdown of the operation comprises deciding to perform the pushdown of the operation:
    instructing the bulk storage to perform the operation on the data; and
    receiving, at the analytics platform, a result of the operation from the bulk storage.

12. The system of claim 7, the computer readable instructions further comprising:
  identifying one or more other operations as candidates for pushdowns, the one or more other operations being selected from among the one or more operations to be performed for fulfilling the request;
  performing one or more combinations of the operation and the one or more other operations on the one or more samples; and
  determining, based on performing the one or more combinations of the operation and the one or more other operations on the one or more samples, which combination of the operation and the one or more other operations to push down to the bulk storage.

13. A computer program product for determining whether to perform a pushdown, the computer program product comprising a computer readable storage medium having program instructions embodied therewith, the program instructions executable by a processor to cause the processor to perform a method comprising:
  receiving a request for analytics to be performed by an analytics platform on data stored in bulk storage;
  identifying an operation as a candidate for a pushdown, the operation being selected from among one or more operations to be performed for fulfilling the request, wherein the pushdown would require the operation to be performed at the bulk storage;
  sampling the data by reading one or more samples of the data, the one or more samples being a fraction of the data;
  performing the operation on the one or more samples; and
  determining, based on performing the operation on the one or more samples, whether to perform the pushdown of the operation, wherein the determining whether to perform the pushdown of the operation comprises:
    estimating, based on performing the operation on the one or more samples, a resource reduction of migrating from the bulk storage to the analytics platform a result of the operation versus migrating the data in full; and
    determining whether the resource reduction exceeds a threshold.

14. The computer program product of claim 13, the method wherein the determining whether the resource reduction exceeds the threshold comprises:
  estimating, based on performing the operation on the one or more samples, a resource cost of performing the operation at the bulk storage; and
  determining whether the resource reduction outweighs the resource cost.

15. The computer program product of claim 13, the method further comprising:
  compressing the one or more samples; and
  determining, based on compressing the one or more samples, whether to compress the data before migration of at least a portion of the data from the bulk storage to the analytics platform.

16. The computer program product of claim 13, the method further comprising:
  if determining whether to perform the pushdown of the operation comprises deciding not to perform the pushdown of the operation:
    receiving, at the analytics platform, the data from the bulk storage; and
    performing, at the analytics platform, the operation on the data; and
  if determining whether to perform the pushdown of the operation comprises deciding to perform the pushdown of the operation:
    instructing the bulk storage to perform the operation on the data; and
    receiving, at the analytics platform, a result of the operation from the bulk storage.

17. The computer program product of claim 13, the method further comprising:
  identifying one or more other operations as candidates for pushdowns, the one or more other operations being selected from among the one or more operations to be performed for fulfilling the request;
  performing one or more combinations of the operation and the one or more other operations on the one or more samples; and
  determining, based on performing the one or more combinations of the operation and the one or more other operations on the one or more samples, which combination of the operation and the one or more other operations to push down to the bulk storage.

18. The computer program product of claim 13, the method further comprising dynamically changing a value of the threshold based on an environment of the analytics platform and the bulk storage.

* * * * *